(12) United States Patent
Desmarais

(10) Patent No.: US 11,512,947 B2
(45) Date of Patent: Nov. 29, 2022

(54) SOLAR ARRAY RACK ALIGNMENT TOOL

(71) Applicant: Ronald D. Desmarais, Williamsburg, ME (US)

(72) Inventor: Ronald D. Desmarais, Williamsburg, ME (US)

( * ) Notice: Subject to any disclaimer, the term of this patent is extended or adjusted under 35 U.S.C. 154(b) by 110 days.

(21) Appl. No.: 17/231,916

(22) Filed: Apr. 15, 2021

(65) Prior Publication Data

US 2022/0333918 A1 Oct. 20, 2022

(51) Int. Cl.
  *G01B 11/27* (2006.01)
  *G01B 5/25* (2006.01)
  *H02S 20/10* (2014.01)

(52) U.S. Cl.
  CPC ............. *G01B 11/27* (2013.01); *G01B 5/25* (2013.01); *H02S 20/10* (2014.12)

(58) Field of Classification Search
  CPC ............ G01B 11/27; G01B 5/25; H02S 20/10
  See application file for complete search history.

(56) References Cited

U.S. PATENT DOCUMENTS

| | | | |
|---|---|---|---|
| 8,119,963 B2 * | 2/2012 | Scanlon | F24S 30/455 250/203.4 |
| 11,296,646 B2 * | 4/2022 | Pindzola | H02S 30/00 |
| 2009/0116013 A1 * | 5/2009 | Tom | G01B 11/27 356/399 |
| 2011/0073161 A1 * | 3/2011 | Scanlon | H02S 10/40 136/246 |
| 2012/0235017 A1 * | 9/2012 | Scanlon | H02S 20/10 136/251 |
| 2016/0190974 A1 * | 6/2016 | Dickey | E04H 6/025 52/173.3 |
| 2021/0021229 A1 * | 1/2021 | Dechant | F24S 30/425 |
| 2022/0056657 A1 * | 2/2022 | West | F24S 25/617 |
| 2022/0069763 A1 * | 3/2022 | Pindzola | F24S 25/61 |
| 2022/0200515 A1 * | 6/2022 | Deel | H02S 20/10 |

* cited by examiner

*Primary Examiner* — Yaritza Guadalupe-McCall
(74) *Attorney, Agent, or Firm* — Anthony D. Pellegrini

(57) ABSTRACT

An alignment tool for use with a solar panel support rack, configured to allow for the easy and rapid positioning of the support rack into proper alignment to receive solar panels.

35 Claims, 7 Drawing Sheets

SOLAR ARRAY RACK ALIGNMENT TOOL

CROSS REFERENCE TO RELATED APPLICATIONS

This application claims the benefit of the provisional patent application, U.S. Ser. No. 63/130,217 ("SOLAR ARRAY RACK ALIGNMENT TOOL"), filed Dec. 23, 2020, by Desmarais, Ronald D., and currently pending, which is hereby incorporated by reference.

BACKGROUND OF THE INVENTION

The solar industry has seen rapid growth over the past decade, and a major contributing factor has been the surge in utility-size solar farms being erected across the country and globe. These solar farms typically consist of numerous solar panels positioned on support structures known as racks. The racks hold the solar panels off the ground in a specific fixed orientation to maximize the amount of solar energy that will fall onto the solar panels. Therefore, proper alignment of the solar panels onto the racks prior to securing the panels thereto is required. In addition, the racks themselves must be properly aligned to avoid placing mechanical stresses on the solar panels when they are secured thereto; such stresses can cause the solar panels to experience shortened life expectancy and sub-par performance, thereby eroding the effectiveness of the entire solar farm.

However, during the construction process of erecting solar farms, the grid array of the racks is typically installed days or even weeks before the solar panel are installed, and alignment problems with the racks are not discovered until the racks are already fixed to the ground and adjusted.

The alignment tool of the present invention is designed to assist with the mounting, leveling, squaring, and alignment of solar panel racking in-ground mount installations. The tool expedites solar racking alignment and accuracy.

Field tests have shown that installers typically require 50-65 minutes to align a 40' rack. Use of the alignment tool of the present invention allows installers to align a 40' rack in half that time with much more accurate results. Use of this tool allows multiple installers to focus on separate jobs, speeding up installation, and helps ensure racking is perfectly aligned so that the racks can receive the solar panels without causing stress or bending of the panels.

It is therefore shown that there is a need for an improved tool for properly aligning solar panels onto support racks during installation.

It is therefore an object of the present invention to provide an alignment tool for properly aligning solar panels onto support racks during installation thereof.

It is a further object of the present invention to provide an alignment tool that allows for more accurate alignment of solar panels onto support racks.

It is yet a further object of the present invention to provide an alignment tool that allows for more rapid installation of solar panels onto support racks.

It is yet a further object of the present invention to provide an alignment tool that is simple and inexpensive to manufacture.

Other objects of the present invention will be readily apparent from the description that follows.

SUMMARY

The alignment tool of the present invention provides installers with a tool to rapidly align utility scale solar farm racking with greater precision, and the ability to make field adjustments to fit their needs.

The alignment tool is comprised of four structural components: an elongate vertical member, an elongate horizontal member, a left diagonal brace, and a right diagonal brace. The elongate vertical member is attached to the midpoint of the elongate horizontal member and is oriented perpendicular to the elongate horizontal member. The two diagonal braces run from the ends of the elongate horizontal member to the elongate vertical member. So configured, the elongate horizontal member, the left diagonal brace, and the right diagonal brace form an isosceles triangle, with the elongate vertical member extending from the base of the triangle through its apex and continuing upwards. To align a solar panel support rack, the alignment tool is placed onto the support rack, the support rack is adjusted to align it with the geometry of the alignment tool, and then the support rack is fixed into that proper alignment.

The alignment tool may comprise downwardly oriented alignment pins which fit into apertures pre-formed into the support rack, thereby simplifying the proper positioning of the alignment tool onto the support rack. The alignment pins may be in fixed positions on the alignment tool, or they may be mounted on moveable sliders so that their positions may be adjusted to accommodate differently configured support racks.

It is to be understood that the foregoing and following description of the invention is intended to be illustrative and exemplary rather than restrictive of the invention as claimed. These and other aspects, advantages, and features of the invention will become apparent to those skilled in the art after review of the entire specification, accompanying figures, and claims.

DETAILED DESCRIPTION OF THE INVENTION

Figure 1:
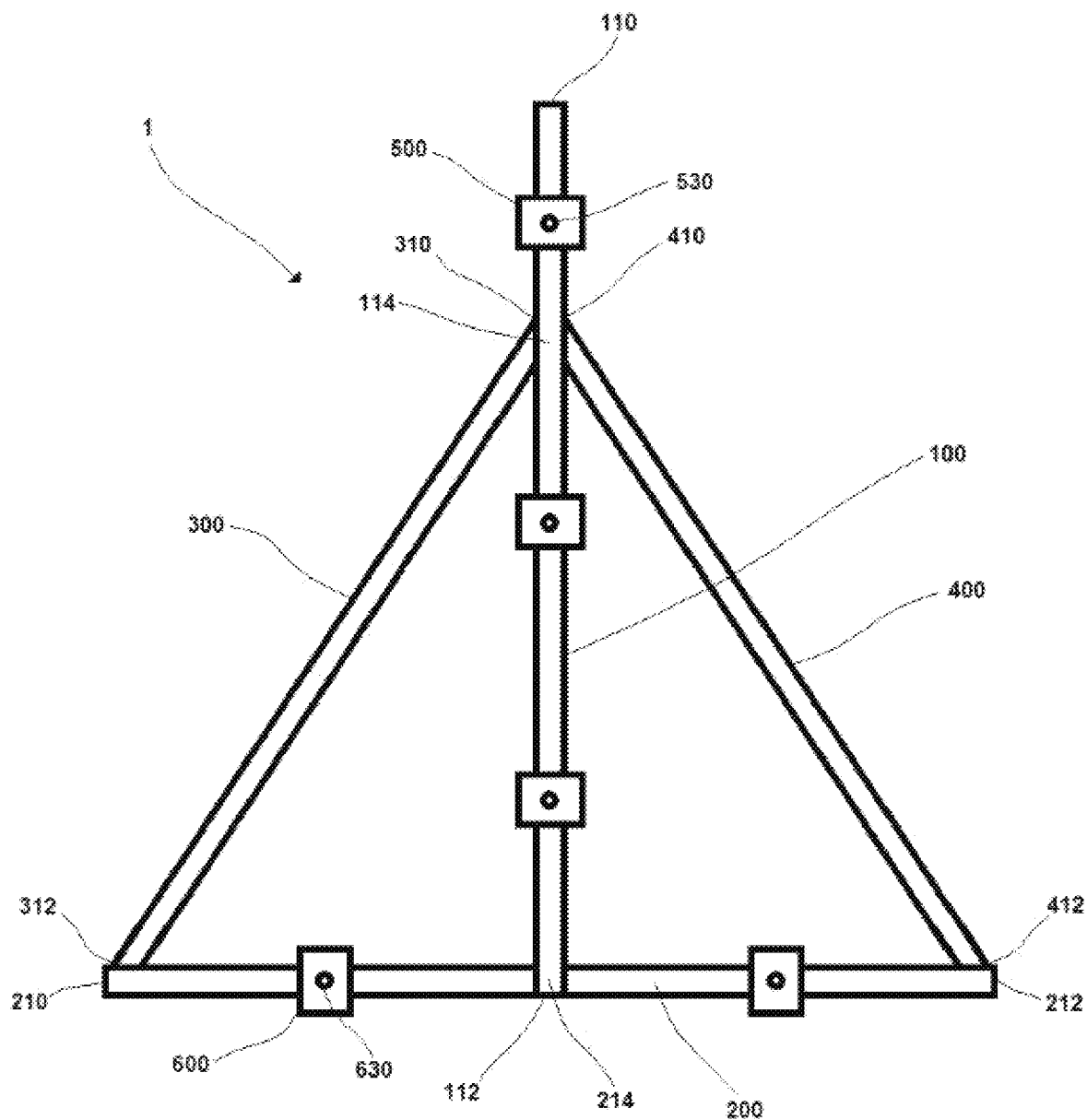
FIG. 1 is a top plan view of one embodiment of the present invention.

In one embodiment, the alignment tool 1 of the present invention is comprised of an elongate vertical member 100, an elongate horizontal member 200, a left diagonal brace 300, and a right diagonal brace 400. See FIG. 1. The elongate vertical member 100 is attached at its lower end 112 to the elongate horizontal member 200 at a location proximate to an attachment point 214 of the elongate horizontal member 200, said attachment point 214 located proximate to the midpoint of the elongate horizontal member 200. The elongate vertical member 100 is oriented substantially perpendicular to the elongate horizontal member 200. The left diagonal brace 300 is attached at its lower end 312 to the left end 210 of the elongate horizontal member 200 and at its upper end 310 proximate to an attachment point 114 of the elongate vertical member 100. The attachment point 114 of the elongate vertical member 100 is located between the upper end 110 of the elongate vertical member 100 and the lower end 112 of the elongate vertical member 100. The right diagonal brace 400 is attached at its lower end 412 to the right end 212 of the elongate horizontal member 200 and at its upper end 410 proximate to the attachment point 114 of the elongate vertical member 100 and proximate to the upper end 310 of the left diagonal brace 300.

Figure 2:
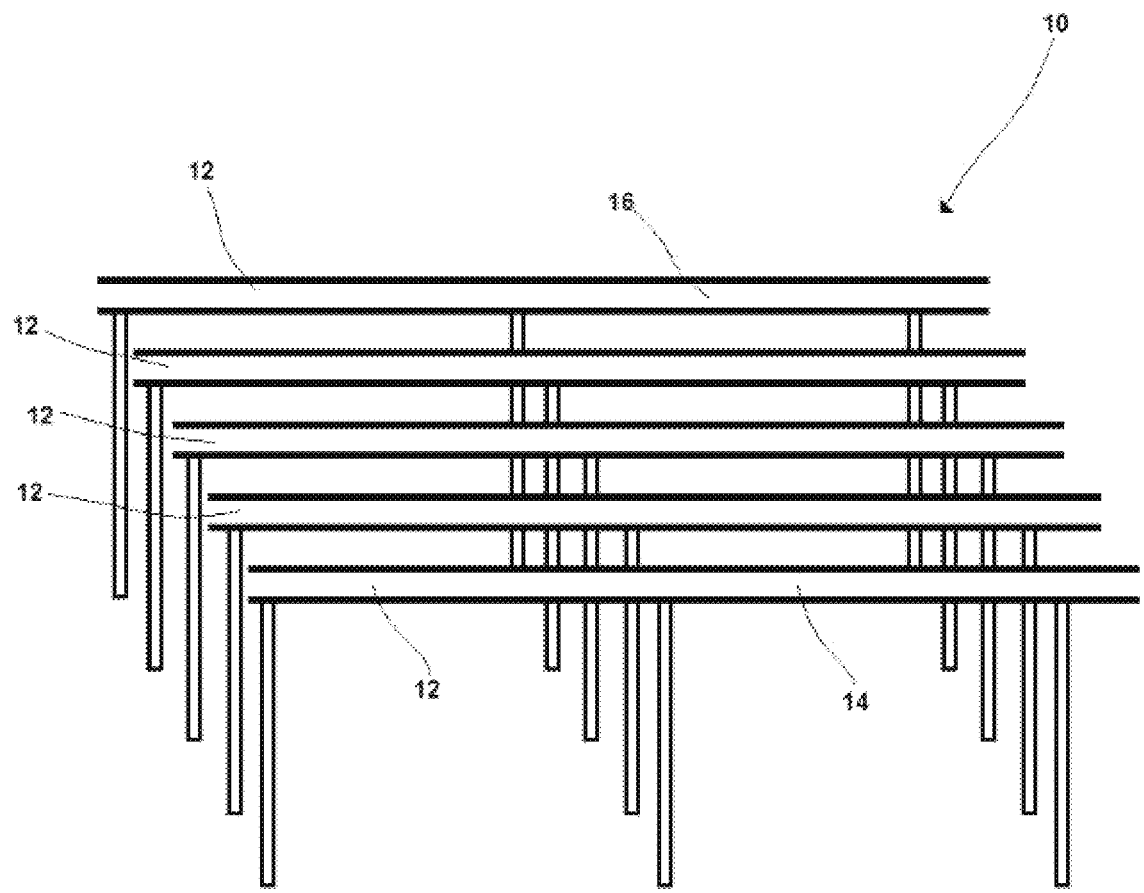
FIG. 2 is a stylized perspective view of a solar panel support rack.
Figure 3:
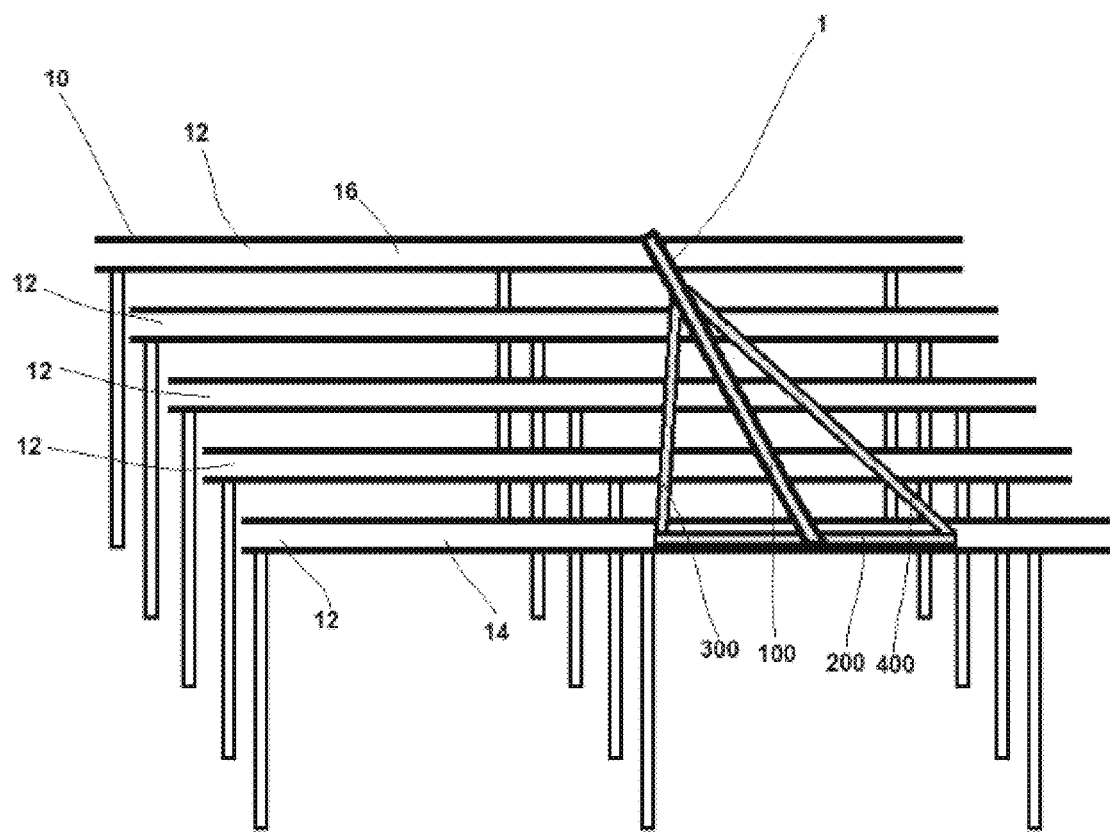
FIG. 3 is a perspective view of an embodiment of the present invention being used on a solar panel support rack.

The alignment tool 1 is placed onto a solar panel support rack 10 to properly align it so that it can receive solar panels. The support rack 10 comprises a plurality of horizontally oriented support members 12 on which the solar panels are supported. See FIG. 2. The support members 12 should be oriented substantially parallel to each other. One of the support members 12 is designated as the lower support member 14 and another support member 12 is designated as the upper supper member 16. The lower support member 14 may be the lowermost support member 12, or there may be one or more support members 12 located below it. The upper support member 16 may be the uppermost support member 12, or there may be one or more support members 12 located above it. There may be one or more support members 12 located between the lower support member 14 and the upper support member 16, or there may be no support members 12 between the lower and upper support members 14,16. The lower and upper support members 14,16 are oriented substantially parallel to each other and are spaced apart from each other by a fixed distance. The alignment tool 1 is placed onto the support rack 10 such that the elongate horizontal member 200 of the alignment tool 1 is placed onto the upper surface of the lower support member 14 of the support rack 10, and the elongate vertical member 100 of the alignment tool 1 comes in contact with the upper surface of the upper support member 16 of the support rack 10. See FIG. 3.

Each of the elongate members of the alignment tool 1 may be constructed of angled aluminum, though other rigid materials may also be used. In the preferred embodiment the elongate members are made of angled aluminum having widths of 2½ inches on each angled side and a thickness of ⅜ inches, with the elongate vertical member 100 having a length of 14 feet and the elongate horizontal member 200 having a length of 8 feet. Other widths, thicknesses, and lengths may also be used, depending on the specifics of the solar racks 10 being installed.

Each of the diagonal braces 300,400 may be constructed of flat aluminum bars, though other rigid materials may also be used. In the preferred embodiment the diagonal braces 300,400 are made of aluminum bars each having a width of 3 inches, a thickness of ⅜ inches, and a length of 12 feet. Other widths, thicknesses, and lengths may also be used, depending on the specifics of the solar racks 10 being installed.

The elongate members and the diagonal braces 300,400 may be attached to each other as described above by welds. Alternatively, mechanical fasteners, such as screws, nuts, bolts, and the like, may be used. Regardless of the mechanism used to affix these components to each other, the resulting structure must be rigid and the elongate vertical member 100 must be oriented perpendicular to the elongate horizontal member 200.

The alignment tool 1 of the present invention may comprise a pair of alignment pins. One of the alignment pins is positioned to align with a hole 20 formed into a support member 12 of the rack 10 when the alignment tool 1 is placed thereon, and the other alignment pin is positioned to align with a hole 20 formed into another support member 12 of the rack 10. In the preferred embodiment the pins are made of stainless steel and are tapered. Other configurations of the pins are also contemplated. The tapering of the pins allows for easy insertion into and removal from the holes 20. In one configuration, both of the pins are located on the underside of the elongate vertical member 100. One pin is located proximate to the lower end 112 of the elongate vertical member 100 and extends downward from and substantially perpendicular to the elongate vertical member 100. The other pin is located on the elongate vertical member 100 at a position away from the first alignment pin and extends downward from and substantially perpendicular to the elongate vertical member 100. In one embodiment of this configuration, the first pin inserts into a hole 20 formed into the lower support member 14 and the other pin inserts into a hole 20 formed into the upper support member 16.

In another configuration, one of the pins may be located on the underside of the elongate vertical member 100 and the other pin may be located on the underside of the elongate horizontal member 200. In yet another configuration more than two pins may be used, with multiple pins located on the underside of the elongate vertical member 100 and multiple pins located on the underside of the elongate horizontal member 200.

Figure 4:
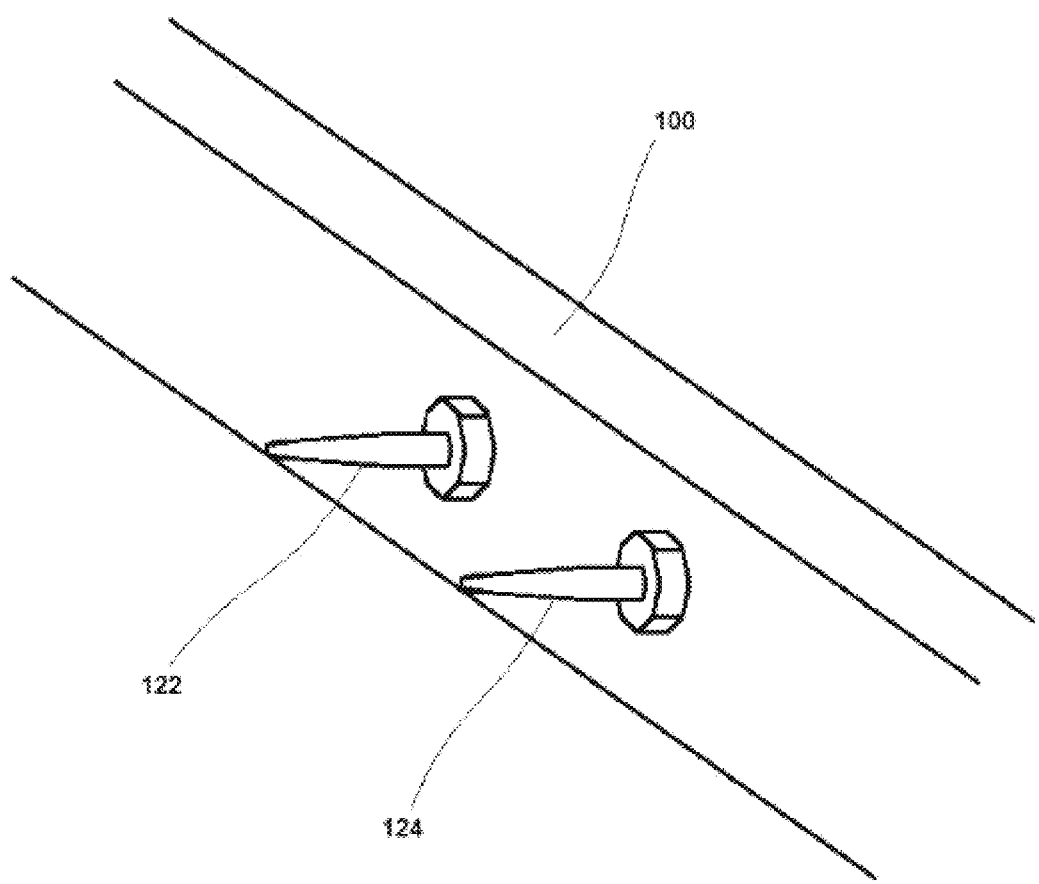
FIG. 4 is a perspective view of the alignment pins located on the underside of the elongate vertical member in one embodiment of the present invention.
Figure 5:
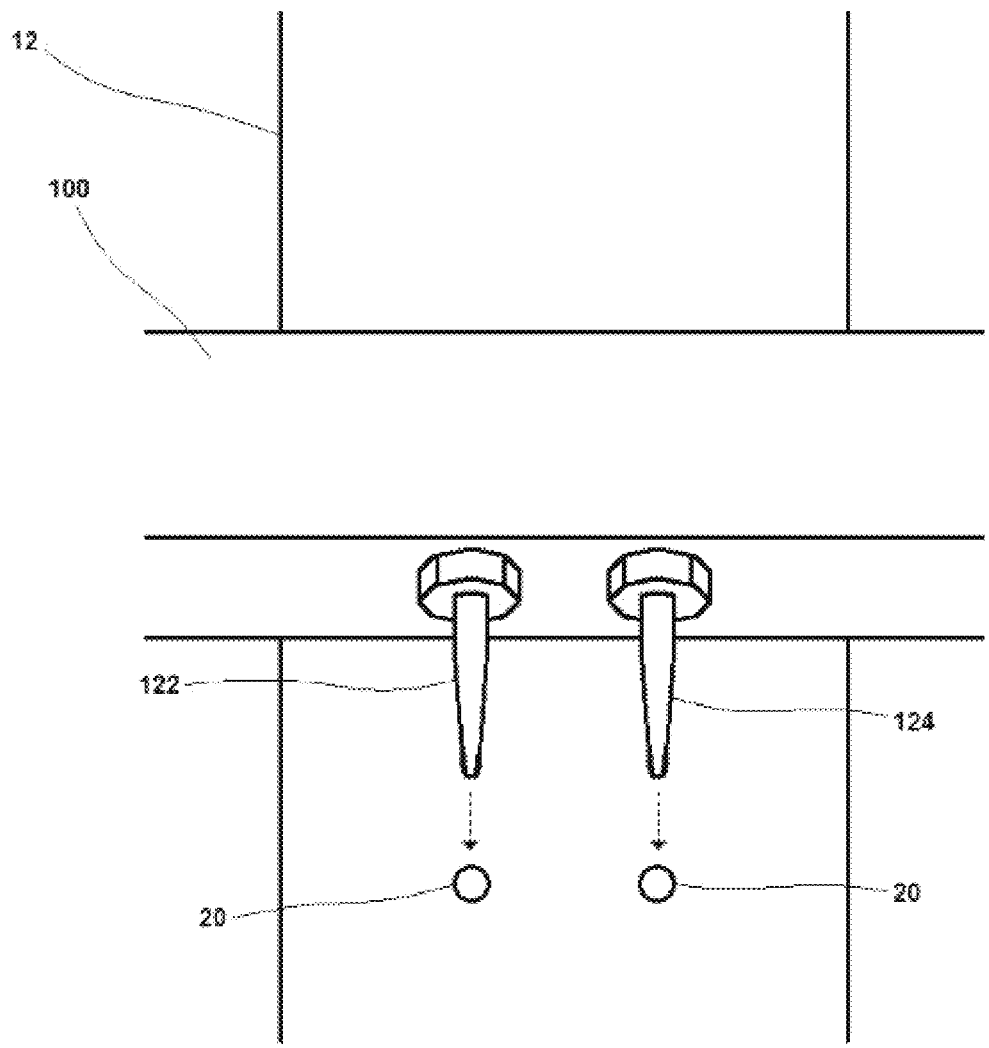
FIG. 5 is a combined perspective view of the alignment pins located on the underside of the elongate vertical member presented together with a top plan view of the corresponding apertures located on one of the support members of a solar panel support rack (the two disparate views are combined to show how the alignment pins are used to align with the holes in the support member).

In a preferred embodiment of the present invention, the elongate vertical member 100 comprises a first alignment pin 122 and a second alignment pin 124. See FIG. 4. The first alignment pin 122 is located proximate to the lower end 112 of the elongate vertical member 100 and extends downward from and substantially perpendicular to the elongate vertical member 100. The first alignment pin 122 is configured to be inserted into a hole 20 formed into the lower support member 14. The second alignment pin 124 is located on the elongate vertical member 100 proximate to the first alignment pin 122 and extends downward from and substantially perpendicular to the elongate vertical member 100. The second alignment pin 124 is configured to be inserted into a second hole 20 formed into the lower support member 14 of the support rack 10. The two alignment pins 122,124 are positioned close to each other, with the distance between them being less than the width of the lower support member 14 of the support rack 10. In the most preferred embodiment the first alignment pin 122 and the second alignment pin 124 are oriented collinearly with the longitudinal axis of the elongate vertical member 100. See FIG. 5. In another embodiment a second pair of alignment pins is located on the elongate vertical member 100 at a position away from the first pair of pins. The second pair of pins is otherwise configured the same as the first pair, and are inserted into a pair of holes 20 located on a support member 12 other than the lower support member 14, preferably the upper support member 16.

In yet another embodiment, the elongate horizontal member 200 comprises one or more alignment pins, with the pins dispersed along the length of the elongate horizontal member 200. Each pin is positioned to align with holes 20 formed into the lower horizontal member of the support rack 10 when the alignment tool 1 is placed thereon.

The alignment tool 1 is designed to be used after the support rack 10 is assembled and loosely bolted together, at which time it must be adjusted and tightened. One support member 12 of the rack 10, usually the first or second from the bottom, is first securely bolted. The alignment tool 1 is then set onto the secure support member 12 by inserting the alignment pins located along the alignment tool's 1 elongate horizontal member 200 into the factory pre-punched holes 20 of the support member 12. Then the remaining slightly loose support members 12 are positioned until their holes 20 align with the remaining tapered alignment pins located along the elongate vertical member 100 of the alignment tool 1. Once all of the support members 12 are in place and the alignment pins of the alignment tool 1 are inserted into the corresponding holes 20, all of the remaining support members' 12 bolts are tightened, ensuring a perfect orientation of the support members 12 of the support rack 10. When all of the support members 12 are tightened, the alignment tool 1 is removed and moved onto the next section of support rack 10. The tapered alignment pins allow the alignment tool 1 to be easily removed from the support rack 10.

The alignment tool 1 of the present invention may be modified for different customer applications, though the length and width generally remain the same. What changes is the fixed positions of the alignment pins. Therefore, the alignment tool 1 may be produced having multiple different fixed pin configurations to be used with different rack designs. This includes racks for solar panels that are mounted vertically rather than horizontally.

In one alternate embodiment the user can adjust the alignment of the pins on the alignment tool 1 to conform to the pre-punched holes 20 in their specific rack design. In this embodiment a vertical slider 500 is machined such that it can be adjusted to slide up or down on the elongate vertical member 100 of the alignment tool 1 in order to match specific widths between the support members 12 of the support rack 10, and can be adjusted in the field. The vertical slider 500 has a fixed mode and a moveable mode, wherein the vertical slider 500 is retained in a fixed position relative to the elongate vertical member 100 when the vertical slider 500 is in fixed mode and is moveable along the length of the elongate vertical member 100 when the vertical slider 500 is in moveable mode. In the preferred embodiment the vertical slider 500 comprises a set screw 530, whereby the vertical slider 500 is placed into fixed mode when the set screw 530 is tightened and the vertical slider 500 is placed in moveable mode when the set screw 530 is loosened. Other means for placing the vertical slider 500 into fixed mode and moveable mode are also contemplated.

Figure 6A:
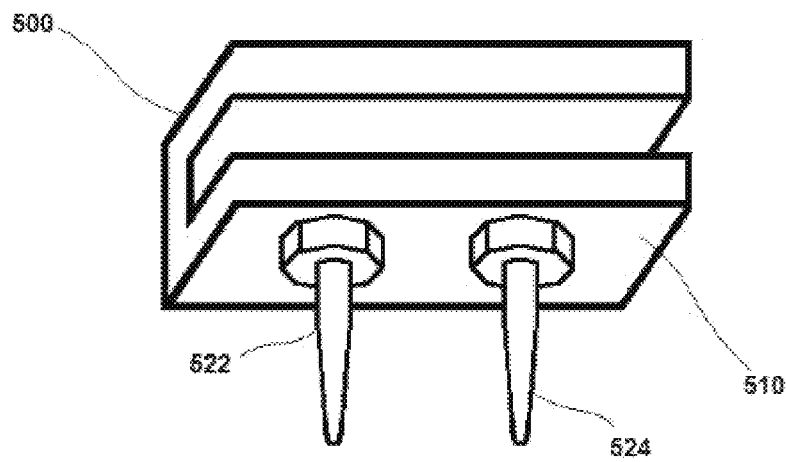
FIG. 6A is a perspective view of the vertical slider having a C-block configuration and a pair of alignment pins located on its underside.
Figure 6B:
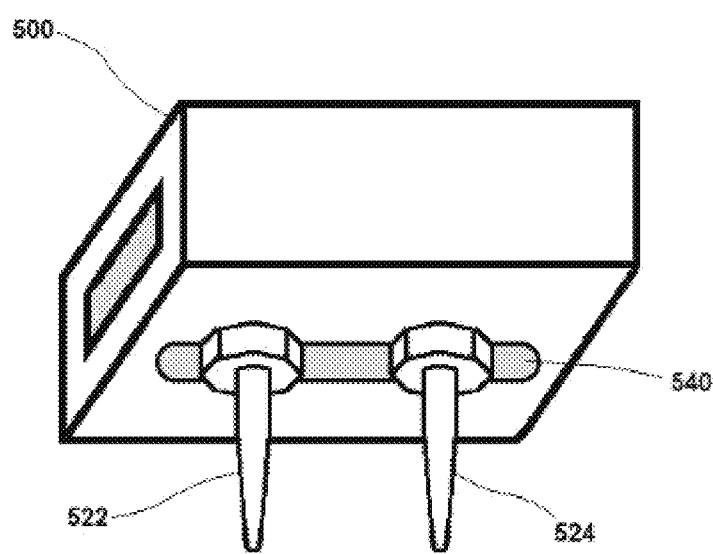
FIG. 6B is a perspective view of the vertical slider having a box configuration and a pair of alignment pins located on its underside within a pin slot.
Figure 7:
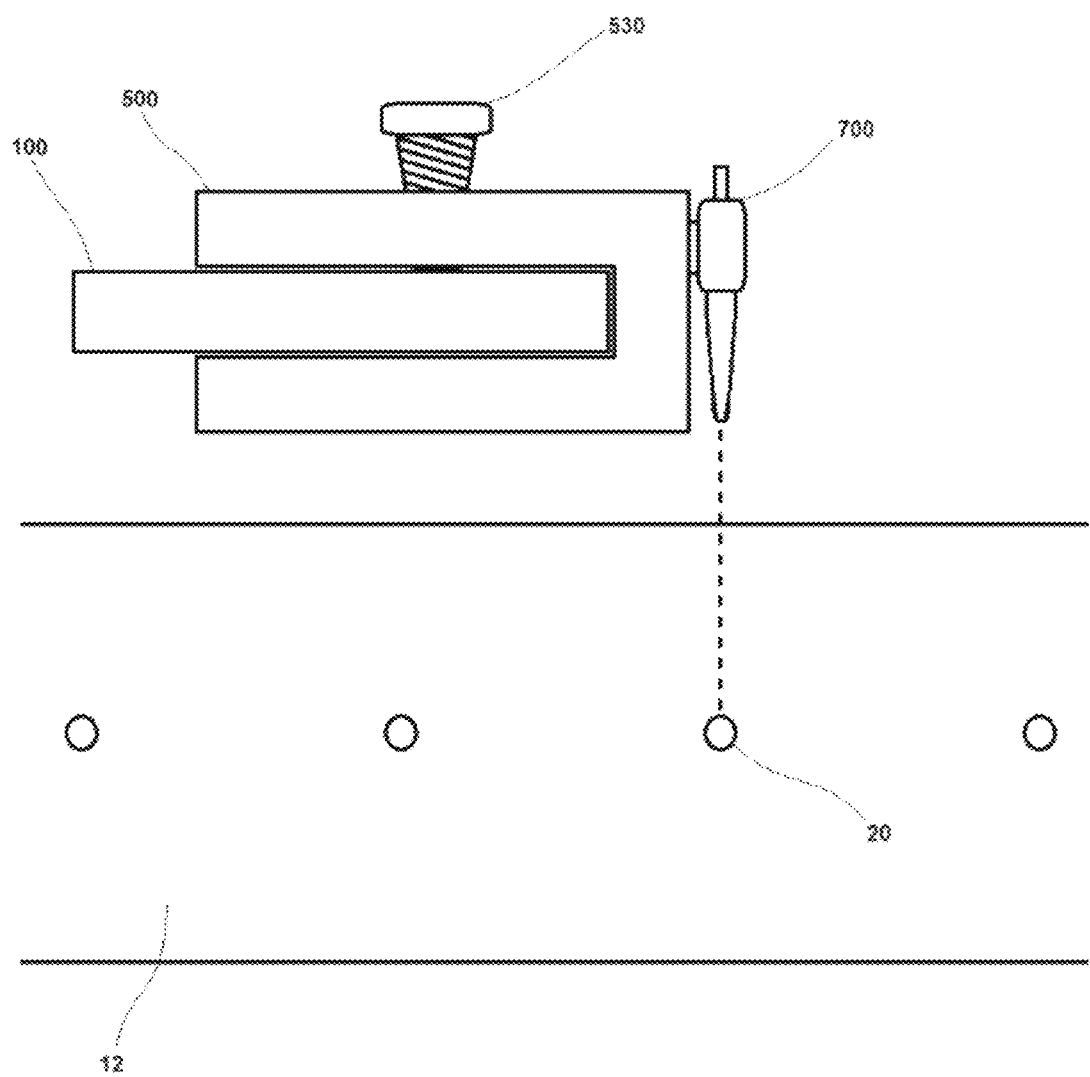
FIG. 7 is a combined front plan view of the vertical slider having a laser indicator located thereon presented together with a top plan view of a support member of the solar panel support rack (the two disparate views are combined to show how the laser indicator is used to align with a hole in the support member).

In one variant, the vertical slider 500 is configured as an open sided "C", with a top surface, a bottom surface, and a single side surface joining the other two surfaces. See FIG. 6A. Because of the open side, the vertical slider 500 may be easily placed onto the elongate vertical member 100 and removed from the elongate vertical member 100. However, it may be susceptible to falling off when it is loosened for repositioning in moveable mode. Therefore, in another variant, the elongate vertical member 100 of the alignment tool 1 could be made from flat stock rather than angled stock. Though some rigidity might be lost using this configuration, the vertical slider 500 could be configured as a box slide. A box slide completely surrounds the elongate vertical member 100, having two closed sides. See FIG. 6B. A vertical slider 500 having the box slide configuration is inserted onto the flat stock elongate vertical member 100 of the alignment tool 1 and is positioned to meet the desired alignment pin configuration, then secured in place by the set screws 530. The box slide may be of unitary construction, or a two-piece box slide may be used, whereby the two pieces are attached to each other using any practical fastening means known in the art.

The vertical slider 500 comprises at least one alignment pin, located on the underside 510 of the vertical slider 500 and extending downward from and substantially perpendicular to the vertical slider 500. The alignment pin is configured to be inserted into a hole 20 formed into one of the support members 12 of the support rack 10. In a variant, the vertical slider 500 may have a pair of adjustment pins 522,524, configured to be inserted into a corresponding pair of holes 20 formed into one of the support members 12 of the support rack 10. In this variant, the alignment pins 522,524 are preferably oriented collinearly with each other and parallel to the longitudinal axis of the elongate vertical member 100. As previously described, the alignment pins 522,524 are preferably tapered, for easy insertion into and removal from the holes 20 in the support members 12 of the support rack 10. The vertical slider 500 may also offer slotted pin mounts 540 that can be adjusted for differing hole widths in the pre-punched holes 20 of the support members 12 of the support rack 10. That is, the distance between the pair of alignment pins 522,524 can be altered as needed, by moving one or both pins within a slot 540.

The alignment tool 1 may also comprise a horizontal slider 600. The horizontal slider 600 is configured the same as the vertical slider 500 and has the same features and function, in all of its variants. The horizontal slider 600 is located on the elongate horizontal member 200 and allows for different spacing in the holes 20 formed into the lower support member 14 of the support rack 10. In yet another embodiment, the alignment tool 1 may have a plurality of vertical sliders 500 and a plurality of horizontal sliders 600, for even greater flexibility of use.

Thus, the vertical slider 500 and horizontal slider 600 allow the alignment pins to be positioned in alignment with the support members 12 by sliding them along the elongate members of the alignment tool 1 and then securing them in place with the set screws 530,630. This relocation of alignment pins allows the tool 1 to be used over and over on different jobs and with different support rack designs. The sliders may be made of machinable aluminum or any light weight material that will hold up to the elements and not corrode or react to the elongate members of the alignment tool 1. It is recommended to use a slide lube on all surfaces and also on threads of bolts as well as the alignment pins. The slide lube will keep all the working parts of the sliders free of corrosion and working properly.

One problem that could arise with the alignment tool 1 is that once the alignment pins are securely in place and the rack 10 is tightened, the alignment tool 1 could be pinched or jammed into the rack 10. For this reason, the alignment pins of the elongate vertical member 100 can be replaced with laser indicators 700 to avoid any pinching or jamming in the rack 10. The alignment pins of the elongate horizontal member 200 are inserted to the pre-punched holes 20 in the lower support member 14; then, instead of trying to insert alignment pins into the remaining support members 12, the laser indicators 700 will project a light beam into the preset locations of the remaining support members 12 to establish proper alignment, and then the support rack 10 can be tightened. The laser indicators 700 may be secured to vertical sliders 500, as described above, to accommodate different support rack configurations. They must have a perpendicular orientation relative to the elongate vertical member 100.

These and other embodiments are contemplated by the present invention. While the preferred embodiments of the present invention have been described, modifications can be made and other embodiments may be devised without departing from the spirit of the invention.

I claim:

1. An alignment tool for use with a solar panel support rack, with said support rack having a plurality of horizontally oriented support members, with each support member having a width and an upper surface, wherein at least a pair of support members are designated a lower support member and an upper supper member, said upper and lower support members being oriented substantially parallel to each other and spaced apart from each other, said alignment tool comprising an elongate vertical member, an elongate horizontal member, a left diagonal brace, and a right diagonal brace, with the elongate vertical member having an upper end, a lower end, an attachment point located between the upper end and the lower end, and a length, said length being at least as great as a distance between the upper support member and the lower support member, the elongate horizontal member having a left end, a right end, and an attachment point located midway between the left end and the right end, the left diagonal brace having an upper end and a lower end, and the right diagonal brace having an upper end and a lower end, wherein the elongate vertical member is attached at its lower end to the elongate horizontal member at a location proximate to the attachment point of the elongate horizontal member, the left diagonal brace is attached at its lower end to the elongate horizontal member at a location proximate to the left end of the elongate horizontal member, the left diagonal brace is attached at its upper end to the elongate vertical member at a location proximate to the attachment point of the elongate vertical member, the right diagonal brace is attached at its lower end to the elongate horizontal member at a location proximate to the right end of the elongate horizontal member, and the right diagonal brace is attached at its upper end to the elongate vertical member at a location proximate to the attachment point of the elongate vertical member, whereby said alignment tool is configured to be placed onto said support rack such that the elongate horizontal member of the alignment tool is placed onto the upper surface of the lower support member of the support rack and a portion of the elongate vertical member of the alignment tool is in contact with the upper surface of the upper support member of the support rack.

2. The alignment tool of claim 1 wherein the elongate vertical member comprises a first alignment pin and a second alignment pin, wherein the first alignment pin is located proximate to the lower end of the elongate vertical member and extends downward from and substantially perpendicular to the elongate vertical member, said first alignment pin configured to be inserted into an aperture formed into the lower support member of the support rack, and the second alignment pin is located on the elongate vertical member and extends downward from and substantially perpendicular to the elongate vertical member, said second alignment pin configured to be inserted into an aperture formed into the upper support member of the support rack.

3. The alignment tool of claim 2 wherein the first alignment pin is tapered and the second alignment pin is tapered.

4. The alignment tool of claim 1 wherein the elongate vertical member comprises a first alignment pin and a second alignment pin, wherein the first alignment pin is located proximate to the lower end of the elongate vertical member and extends downward from and substantially perpendicular to the elongate vertical member, said first alignment pin configured to be inserted into a first aperture formed into the lower support member of the support rack, and the second alignment pin is located on the elongate vertical member proximate to the first alignment pin and extends downward from and substantially perpendicular to the elongate vertical member, said second alignment pin configured to be inserted into a second aperture formed into the lower support member of the support rack.

5. The alignment tool of claim 4 wherein the first alignment pin and the second alignment pin are oriented collinearly and parallel to a longitudinal axis of the elongate vertical member.

6. The alignment tool of claim 4 wherein the first alignment pin is tapered and the second alignment pin is tapered.

7. The alignment tool of claim 4 wherein the elongate vertical member comprises a third alignment pin and a fourth alignment pin, wherein the third alignment pin is located on the elongate vertical member and extends downward from and substantially perpendicular to the elongate vertical member, said third alignment pin configured to be inserted into a first aperture formed into the upper support member of the support rack, and the fourth alignment pin is located on the elongate vertical member proximate to the third alignment pin and extends downward from and substantially perpendicular to the elongate vertical member, said fourth alignment pin configured to be inserted into a second aperture formed into the upper support member of the support rack.

8. The alignment tool of claim 7 wherein the third alignment pin and the fourth alignment pin are oriented collinearly and parallel to a longitudinal axis of the elongate vertical member.

9. The alignment tool of claim 7 wherein the third alignment pin is tapered and the fourth alignment pin is tapered.

10. The alignment tool of claim 1 wherein the elongate horizontal member comprises one or more alignment pins, with each alignment pin extending downward from and substantially perpendicular to the elongate horizontal member, each said alignment pin configured to be inserted into one of a corresponding number of apertures formed into the lower support member of the support rack.

11. The alignment tool of claim 10 wherein each of the one or more alignment pins is tapered.

12. The alignment tool of claim 10 further comprising one or more laser indicators, each said laser indicator capable of projecting a visible light beam, with each said laser indicator oriented perpendicular to the elongate vertical member of the alignment tool, such that the visible light beam is projected in a downward direction, whereby each said laser indicator is positioned to be aligned with an aperture formed into a support member of the support rack.

13. The alignment tool of claim 12 wherein the elongate vertical member comprises one or more vertical sliders corresponding in number to the one or more laser indicators,
wherein each of the laser indicators is associated with one of the vertical sliders and attached thereto,
each of the vertical sliders is located on the elongate vertical member and slidably attached thereto,
each of the vertical sliders has a fixed mode and a moveable mode, wherein said vertical slider is retained in a fixed position relative to the elongate vertical member when said vertical slider is in fixed mode and said vertical slider is moveable along the elongate vertical member when said vertical slider is in moveable mode, and
each of the vertical sliders comprises one or more set screws, whereby said vertical slider is placed into fixed mode when the one or more set screws are tightened and said vertical slider is placed in moveable mode when the one or more set screws are loosened.

14. The alignment tool of claim 1 wherein the elongate vertical member comprises a vertical slider,
said vertical slider being located on the elongate vertical member and slidably attached thereto,
wherein said vertical slider comprises a first alignment pin, said first alignment pin located on an underside of the vertical slider extending downward from and substantially perpendicular to the vertical slider, said first alignment pin configured to be inserted into a first aperture formed into a support member of the support rack.

15. The alignment tool of claim 14 wherein the vertical slider comprises a second alignment pin, said second alignment pin located on the underside of the vertical slider proximate to the first alignment pin and extending downward from and substantially perpendicular to the vertical slider, said second alignment pin configured to be inserted into a second aperture formed into said support member of the support rack.

16. The alignment tool of claim 15 wherein the first alignment pin and the second alignment pin are oriented collinearly and parallel to a longitudinal axis of the elongate vertical member.

17. The alignment tool of claim 15 wherein the first alignment pin is tapered and the second alignment pin is tapered.

18. The alignment tool of claim 15 wherein the first alignment pin is moveably positionable on the vertical slider and the second alignment pin is moveably positionable on the vertical slider.

19. The alignment tool of claim 14 wherein the first alignment pin is tapered.

20. The alignment tool of claim 14 wherein the vertical slider has a fixed mode and a moveable mode, wherein the vertical slider is retained in a fixed position relative to the elongate vertical member when the vertical slider is in fixed mode and the vertical slider is moveable along the elongate vertical member when the vertical slider is in moveable mode.

21. The alignment tool of claim 20 wherein the vertical slider comprises one or more set screws, whereby the vertical slider is placed into fixed mode when the one or more set screws are tightened and the vertical slider is placed in moveable mode when the one or more set screws are loosened.

22. The alignment tool of claim 14 wherein the first alignment pin is moveably positionable on the vertical slider.

23. The alignment tool of claim 1 wherein the elongate horizontal member comprises a horizontal slider,
said horizontal slider being located on the elongate horizontal member and slidably attached thereto,
wherein said horizontal slider comprises a first alignment pin, said first alignment pin located on an underside of the horizontal slider extending downward from and substantially perpendicular to the horizontal slider, said first alignment pin configured to be inserted into a first aperture formed into the lower support member of the support rack.

24. The alignment tool of claim 23 wherein the horizontal slider comprises a second alignment pin, said second alignment pin located on the underside of the horizontal slider proximate to the first alignment pin and extending downward from and substantially perpendicular to the horizontal slider, said second alignment pin configured to be inserted into a second aperture formed into the lower support member of the support rack.

25. The alignment tool of claim 24 wherein the first alignment pin and the second alignment pin are oriented collinearly and perpendicular to a longitudinal axis of the elongate horizontal member.

26. The alignment tool of claim 24 wherein first alignment pin is tapered and the second alignment pin is tapered.

27. The alignment tool of claim 24 wherein the first alignment pin is moveably positionable on the horizontal slider and the second alignment pin is moveably positionable on the horizontal slider.

28. The alignment tool of claim 23 wherein the first alignment pin is tapered.

29. The alignment tool of claim 23 wherein the horizontal slider has a fixed mode and a moveable mode, wherein the horizontal slider is retained in a fixed position relative to the elongate horizontal member when the horizontal slider is in fixed mode and the horizontal slider is moveable along the elongate horizontal member when the horizontal slider is in moveable mode.

30. The alignment tool of claim 29 wherein the horizontal slider comprises one or more set screws, whereby the horizontal slider is placed into fixed mode when the one or more set screws are tightened and the horizontal slider is placed in moveable mode when the one or more set screws are loosened.

31. The alignment tool of claim 23 wherein the first alignment pin is moveably positionable on the horizontal slider.

32. The alignment tool of claim 1 wherein each of the elongate vertical member and elongate horizontal member is constructed of angled aluminum.

33. The alignment tool of claim 1 wherein each of the left diagonal brace and the right diagonal brace is constructed of a flat aluminum bar.

34. The alignment tool of claim 1 wherein the elongate vertical member, the elongate horizontal member, the left diagonal brace, and the right diagonal brace are attached to each other by welds.

35. The alignment tool of claim 1 wherein the elongate vertical member, the elongate horizontal member, the left diagonal brace, and the right diagonal brace are attached to each other by mechanical fasteners.

* * * * *